United States Patent [19]

Loveless et al.

[11] Patent Number: 4,506,225

[45] Date of Patent: Mar. 19, 1985

[54] METHOD FOR REMOTE MEASUREMENT OF ANOMALOUS COMPLEX VARIATIONS OF A PREDETERMINED ELECTRICAL PARAMETER IN A TARGET ZONE

[75] Inventors: Arthur J. Loveless, Esquessing Township, Canada; Anthony R. Barringer, Golden, Colo.

[73] Assignee: Barringer Research Limited, Toronto, Canada

[21] Appl. No.: 334,712

[22] Filed: Dec. 28, 1981

[51] Int. Cl.³ .................... G01V 3/08; G01V 3/165; G01V 3/16
[52] U.S. Cl. .................................. 324/334; 324/330; 328/165
[58] Field of Search ........ 324/326, 329, 330, 334–337, 324/360, 362; 328/165

[56] References Cited

U.S. PATENT DOCUMENTS

| | | | |
|---|---|---|---|
| 2,527,559 | 10/1950 | Lindblad et al. | 324/336 |
| 2,542,462 | 2/1951 | Beard | 324/334 |
| 2,929,984 | 3/1960 | Puranen et al. | 324/330 X |
| 3,105,934 | 10/1963 | Barringer | 324/330 |
| 3,108,220 | 10/1963 | Ruddock | 324/330 |
| 3,801,896 | 4/1974 | Duroux et al. | 324/334 |
| 3,852,659 | 12/1974 | Barringer | 324/334 |
| 3,950,695 | 4/1976 | Barringer | 324/334 |
| 3,967,190 | 6/1976 | Zonge | 324/362 |

*Primary Examiner*—Gerard R. Strecker
*Attorney, Agent, or Firm*—Rogers, Bereskin & Parr

[57] ABSTRACT

According to the method, a primary electromagnetic field, defined by a waveform of known shape and containing a plurality of frequency components, is directed towards a target zone. Signals are received in the vicinity of the target zone which are attributable to eddy currents in conductors present in the target zone and direct coupling with the primary field. A reference signal having a complex waveform similar to that of the primary field is generated artificially and the reference signal is compared with the received signals in a digital computer in such a manner as to minimize the amount of signal present in the received signal which is attributable to direct coupling with the primary field. The resulting received signal may then be correlated with a plurality of stored reference waveforms in order to obtain the best fit.

7 Claims, 10 Drawing Figures

METHOD FOR REMOTE MEASUREMENT OF ANOMALOUS COMPLEX VARIATIONS OF A PREDETERMINED ELECTRICAL PARAMETER IN A TARGET ZONE

This invention relates to the detection of electrically conductive bodies and in particular to an improved method of analyzing data obtained in airborne geophysical prospecting surveys.

There are two principal types of airborne electromagnetic prospecting systems in current use. One type employs rigid mounting of transmitting and receiving coils and the other type employs a non-rigid arrangement. In "rigid" systems the transmitting and receiving coils are mounted on the opposing wingtips of an aircraft, on the nose and tail of the aircraft fuselage, or at the opposing ends of a long rigid boom towed beneath a helicopter. In all such systems the coils are seldom more than 25 meters apart and often much less. In such systems it is necessary for best results, to support the coils with a high degree of rigidity so that coil spacing and angular changes do not exceed more than a few parts per million. This is difficult to achieve in practice. As a result, generally it is desirable to operate rigid systems in smooth air conditions.

Another problem with a number of conventional rigid systems is that when the receiving coil is mounted on the wingtips or in the tail of the aircraft, additional noise is caused by small movements of the metal skin of the aircraft, since such movements tend to change the pattern of eddy currents induced by the transmitter in the aircraft. Furthermore, stray ground currents in the aircraft from generators and other electrical equipment in the aircraft create additional noise which is sometimes difficult to suppress. An example of a conventional "rigid" system is that shown in U.S. Pat. No. 3,108,220.

In non-rigid airborne electromagnetic systems the receiving coil generally is towed behind the aircraft in a non-metallic streamlined aerodynamic container or "bird" which typically is connected to the aircraft by at least about 50 meters of tow cable. An advantage of this arrangement is that it removes the bird from chosen proximity with the aircraft and thereby eliminates some of the sources of noise referred to above. However, as the towed receiving coil or coils continually change their coupling with the primary field it is necessary to eliminate the primary field by, for example, detecting only those secondary fields which are precisely in phase quadrature (i.e. 90° out of phase) with the primary field. One of the disadvantages of such quadrature systems, however, is that much of the secondary field is discarded since it is in-phase with the primary field. Furthermore, the rather limited amount of information available in a quadrature system does not permit a complex conductivity analysis of the underlying terrain. An example of a non-rigid airborne system is that shown in U.S. Pat. No. 2,929,984.

Many of the problems associated with the rigid and non-rigid systems referred to above were overcome in an invention of Anthony R. Barringer which is the subject of U.S. Pat. No. 3,105,934 (U.S. Pat. No. Re. 25908). According to this invention, high current pulses of several hundred amperes pass through a loop surrounding an aircraft in order to generate powerful electromagnetic pulses. A receiving coil, towed in a bird behind the aircraft, detects these pulses together with the transient signals attributable to decaying eddy currents which have been induced in the underlying terrain. High sensitivity is achieved by using powerful fields, and noise caused by changes in coupling between the receiving coil towed behind the aircraft and the primary coil is eliminated by detecting secondary fields only during the period after the primary pulse has been switched off. Thus the receiving coils are insensitive to the primary field and detect only secondary fields radiated by underlying conductive objects. This time separation allows the use of primary field strengths which are in the vicinity of 1,000 times stronger than those typically employed in continuous wave EM systems. Another important feature of the above system is that transient eddy current response of conductive overburden tends to die out more rapidly than the response from underlying ore body conductors which generally have significantly higher conductivity. Delayed sampling gates are employed to separate out the response from good conductors from those of near surface poor conductors.

Although the above system has been very successful commercially, it has the disadvantage that a very large part of the secondary field is discarded since it is generated during the period of the primary pulse. As a result, it is necessary to use a very much higher power transmitter than typically is employed in other systems in order to compensate for the fact that most of the secondary field is discarded.

U.S. Pat. Nos. 3,852,659 and 3,950,695 of Anthony R. Barringer disclose inventions intended to overcome the above problem. These patents disclose a system in which a primary inductive electromagnetic field having a complex waveform (i.e. a waveform comprising a plurality of frequencies) is caused to induce eddy currents in conductive objects lying in the vicinity of the field, which will in turn re-radiate secondary electromagnetic fields. These secondary electromagnetic fields have a waveform which is distorted with respect to the primary field waveform to a degree which is dependent upon the size, shape, conductivity, polarizability and permeability of the orebody or conductive object. Such distortion is due to the fact that a complex waveform contains a plurality of frequency components, each one of which is reradiated (as a result of eddy currents) at different relative amplitudes and phase shifts with respect to the primary waveform. The amplitude and phase shift of the secondary field for each frequency component is determined by the characteristics of the conductive body. In addition, overburden and mineral deposits in general have certain separately identifiable families of responses which can be broadly classified and distinguished one from the other.

Computerized signal processing techniques are used in the above patents to obtain the best match between the waveforms of the received signals and those of stored reference waveforms which correspond to known geological structures or conditions. An advantage of this system over systems such as the induced pulse transient technique described in U.S. Pat. No. 3,105,934 (U.S. Pat. No. Re. 25908) is that the entire secondary field may be analyzed if desired, i.e. the field received during the time when the primary field is operative. Also, the system provides in effect narrow band filtering of the desired waveforms and rejection of noise signals such as thermal noise in the receiving coil, microphonics in the receiver, sferic interference from nearby and distant thunderstorms, etc.

A problem with the foregoing system described in U.S. Pat. Nos. 3,852,659 and 3,950,695 is that the primary field tends to dominate the relatively weak secondary fields, and since the primary field itself contains no information concerning the underlying terrain (all of which information is contained within the secondary fields), the performance of the system is degraded to the extent the primary field interferes with the analysis of the secondary field.

In prior "rigid" systems of the kind referred to above, where, for example, transmitting and receiving coils were positioned on opposite ends of a rigid boom with their respective axes collinear or parallel so that the coils were in maximum coupling, the signal induced in the receiving coil attributable to direct coupling with the transmitting coil was bucked out by, for example, sending a current through the receiving coil of opposite phase to that of the current flowing through the transmitting coil and of sufficient amplitude to cancel as nearly as possible the signal attributable to the primary field. Examples of prior patents showing various methods of bucking out the primary field are shown in U.S. Pat. Nos. 3,108,220 and 2,929,984. Such cancellation cannot be perfect in any practical airborne system, however, as even minor movements of the boom can generate detectable noise which limits the sensitivity of the system. Also, these techniques are applicable only in a rigid system, and would be difficult if not impossible to implement in a system using a primary field comprising a plurality of different frequency components.

An object of the present invention is therefore to provide an improved method of analyzing secondary fields emanating from a conducting body in a target zone in order to measure anomalous complex variations of one or more predetermined electrical parameters in such conducting body.

According to a preferred embodiment of the invention, the foregoing object is accomplished by generating a primary electromagnetic field and directing it toward a target zone. The primary field is defined by a primary waveform of known shape and it contains a plurality of frequency components appropriate for measurement of the desired electrical parameter or parameters of a conductive body in the target zone. The frequency components are of known frequency, phase and relative amplitude. Signals are then received which are attributable to (1) decaying eddy currents in such conductive body and (2) direct coupling with the primary field. Such signals may be received when the amplitude of the primary field is varying (nonlinearly or otherwise) with time. In addition, a signal is generated artificially which has a complex waveform similar to that of the primary field and this artificially generated signal after appropriate processing is then fed to a digital computer which operates on the received signal, under control of a suitable algorithm, in such a manner as to minimize the resulting amount of signal present in the received signal which is attributable to direct coupling with the primary field. The artificially generated signal is effectively adjusted on a periodic basis to minimize the effect of variations in the direct coupling, which can result for example from changes in relative orientation of transmitting and receiving coils during surveying. Then, having thus minimized the effect of the primary field, the resulting received signal may be correlated by means of computerized signal processing techniques with a plurality of stored reference waveforms in order to obtain the best fit, in the manner shown in U.S. Pat. Nos. 3,852,659 and 3,950,695.

The foregoing and other embodiments of the invention will be more fully understood in the following description, with reference to the attached drawings, in which.

Figure 1:
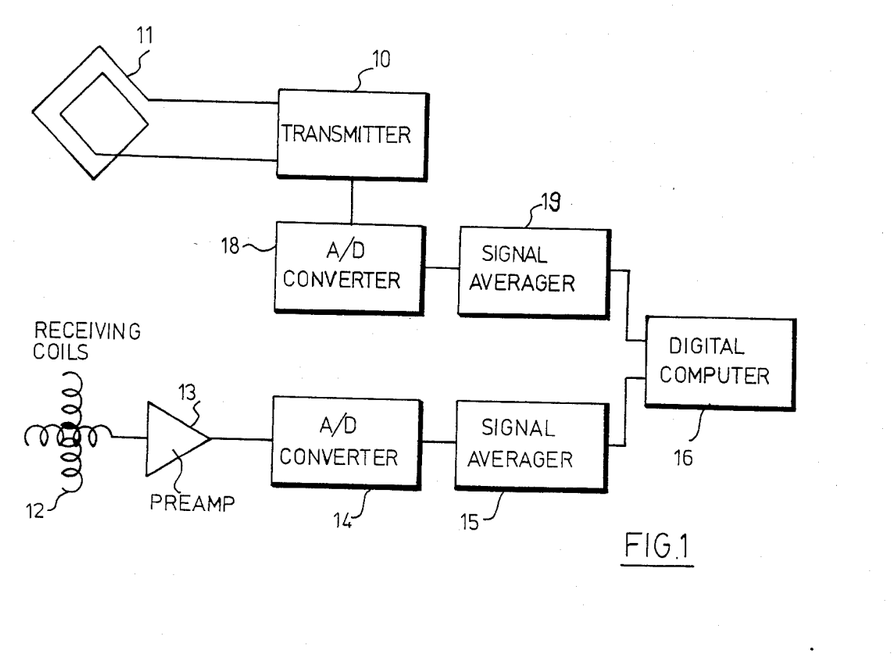
FIG. 1 is a block diagram of an apparatus for use in performing an improved method according to the invention.
Figure 2:
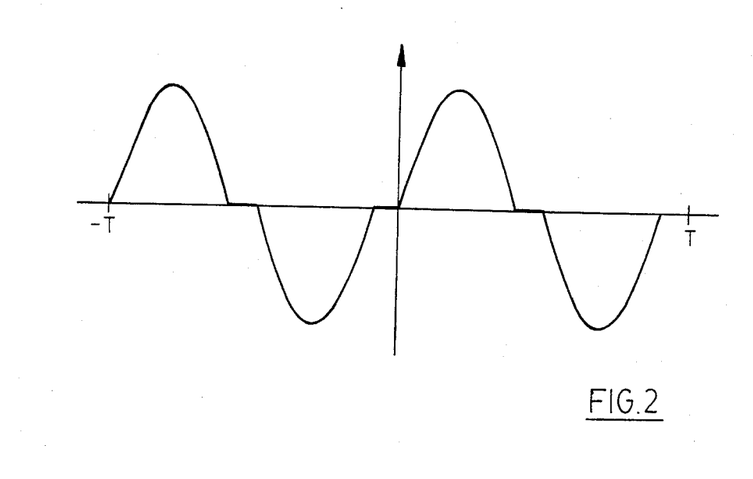
FIG. 2 is a graphical view showing a typical waveform of the primary field.

Referring to the drawings, and in particular to FIG. 1, a primary electromagnetic field, the waveform of which is shown in FIG. 2, is generated by passing current produced by a transmitter 10 through a multiturn loop 11 which may be installed on an aircraft. The loop 11 is a conventional geophysical transmitting loop. The power delivered by the transmitter 10 should be as large as possible consistent with the payload of the aircraft, taking into account the weight of the loop 11 and other equipment, operators, etc. The primary field and the secondary fields emanating from conductive bodies in the underlying terrain or target zone are picked up in one or more receiving coils 12 towed in a finned, torpedo shaped vehicle (not shown) hereinafter referred to as a bird. The receiving coils 12 are usually placed in orthogonal relationship to each other with one of the coils in maximum coupling with the primary field. The receiving coils 12 are connected to a preamplifier 13 the output of which is carried to signal processing equipment (to be described below) in the aircraft, by means of electrical connectors within a tow cable connecting the bird to the aircraft.

Figure 3:
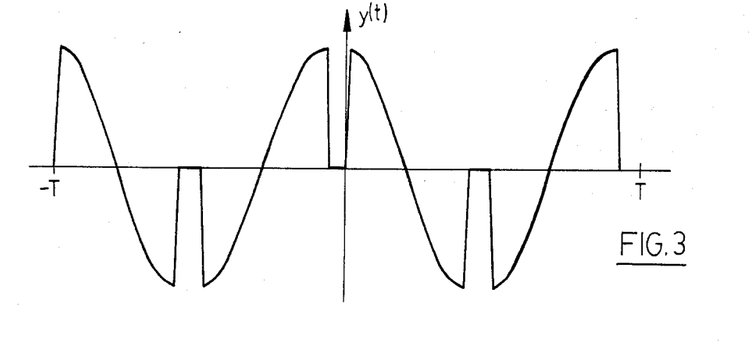
FIG. 3 is a graphical view showing a theoretical received waveform which is attributable only to the primary field.
Figure 4:
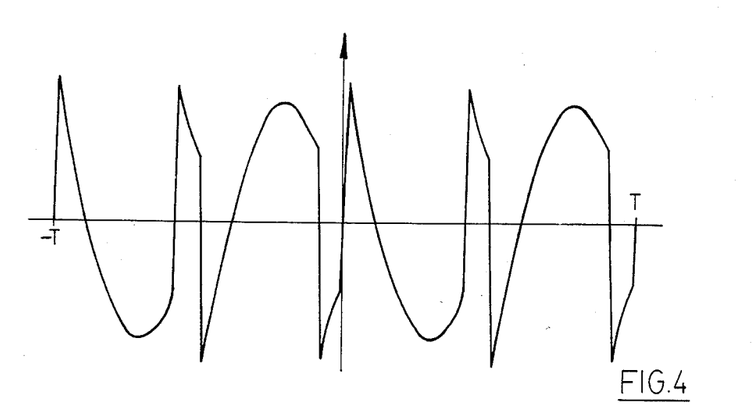
FIG. 4 is a graphical view showing a theoretical received signal attributable only to secondary fields emanating from a conductive body intersected by the primary field and containing no component attributable to the primary field.

The primary field detected by the receiving coils 12 is in the form of its derivative since the coils 12 are sensitive to the rate of change of the magnetic flux of the loop 11. The received waveform of the primary field is shown in FIG. 3. When a conductive body such as an ore body is intersected by the primary field, a secondary field is produced which is caused by eddy currents flowing in the orebody. The secondary field as detected, is distorted as shown typically in FIG. 4. The positions of the zero crossing of the waveform are distorted and the relative amplitudes of the low and high frequency components of the waveform are changed in the received signal as compared with the primary field. The resultant of the primary and secondary fields as detected by the coils 12 is shown in FIG. 5 from which it will readily be apparent that the primary field waveform, being much more intense in the vicinity of the coils 12, swamps the secondary field response.

Figure 5:
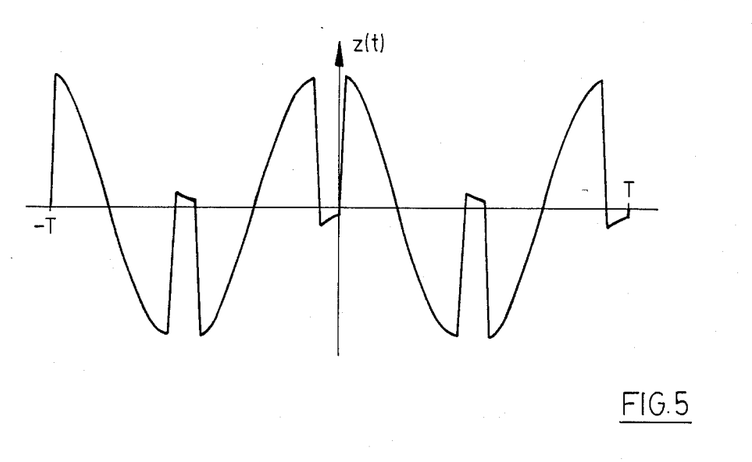
FIG. 5 is a graphical view showing a received waveform which comprises the resultant of a signal attributable to direct coupling with the primary field and a signal attributable to secondary fields caused by eddy currents flowing in a conductive body intersected by the primary field.

Referring once again to FIG. 1, the output of the preamplifier 13 is fed via the tow cable (not shown) to an analog to digital converter in the aircraft, which converts the analog signal originating in the coils 12 (e.g. having a waveform as shown in FIG. 5) to a digital signal which may readily be processed by a digital computer 16. Interposed between the analog to digital computer 14 and the computer 16 is a synchronous signal averager 15 where successive cycles of the received signal are stacked. Similarly, a reference signal is derived from the transmitter 10 which has a waveform similar to that of the primary field as detected by the coils 12 (FIG. 3). This signal likewise is fed to an analog to digital converter 18 in the aircraft, from which the digitized signal is fed to a signal averager 19 where successive cycles of the transmitted waveform are synchronously stacked. The output of the signal averager is fed to the digital computer 16. The signal averagers 15 and 19 enhance the signals passing through them by coherently stacking them over a given period such as one second so that the signals fed to the digital computer have less noise than otherwise would be the case.

The procedure used in the computer for analyzing the secondary fields is the same as that described in U.S. Pat. No. 3,950,695 where an optimum fit is provided between received waveforms and a family of stored waveforms specific to typical overburden and orebody responses. However, whereas in the case of the method shown in the above patent, the resultant of the primary and secondary fields as detected in the receiving coils is correlated against stored reference waveforms, in the present invention the component of the received signal that is attributable to the primary field is removed as much as possible before further processing takes place, i.e. prior to the correlation step indicated above. The primary field component can be removed in several ways, through the use of appropriate computer software, which will now be described mathematically. The first approach involves separation of the received waveform into two components, one which is similar (or identical) to the primary waveform shape, and one which is orthogonal to or different from the primary waveform shape. The discussion to follow deals with this first approach in both the time and frequency domains. The second approach involves separation of the impulse response of the system into two components, one which is indistinguishable from changes in coupling with the primary field and one which is solely attributable to secondary fields. This impulse response approach likewise is discussed in both the time and frequency domains.

Time Domain Calculation of Orthogonal Waveform

A periodic primary waveform such as that shown in FIG. 3 may be represented by a time series $y_i$, $i=0,1,\ldots(n-1)$ representing the mean waveform amplitudes at n equally spaced times $t_i = iT/n$, $i = 0,1,\ldots(n-1)$ covering 1 period of the waveform, having period T.

The mean value of the resultant waveform as detected by the coils 12 and as shown in FIG. 5 may be represented by a time series $z_i$, $i=0,1,\ldots(n-1)$ representing mean waveform amplitudes at n equally-spaced sampling points at times $t_i=iT/n$, $i=0,1,\ldots(n-1)$. The resultant waveform represented by time series $z_i$ may be separated into 2 components: a component which has similar shape to the primary waveform (represented by time series $p_i$) and a component which has a different shape (represented by time series $q_i$).

$$z_i = p_i + q_i \quad i = 0,1,\ldots(n-1) \tag{1}$$

The separation of $z_i$ into the above components may be accomplished by fitting the time series $y_i$, to $z_i$ by least squares and defining $q_i$ as the residual or othogonal time series. This is achieved by minimizing the function $$h(a) = \sum_{i=0}^{n-1} (z_i - a \cdot y_i)^2 \tag{2}$$

The minimum occurs when $dh/da = 0$, i.e. when $$a = \frac{\sum_{i=0}^{n-1} z_i \cdot y_i}{\sum_{i=0}^{n-1} y_i^2} \tag{3}$$

Figure 6:
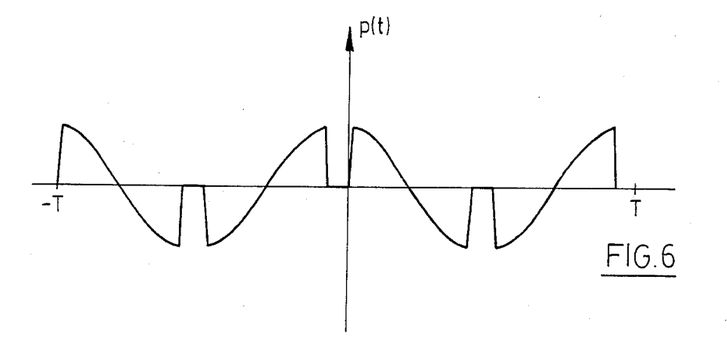
FIG. 6 is a graphical view showing an artificially generated waveform having a shape resembling that of the portion of the received signal which is attributable to direct coupling with the primary field.
Figure 7:
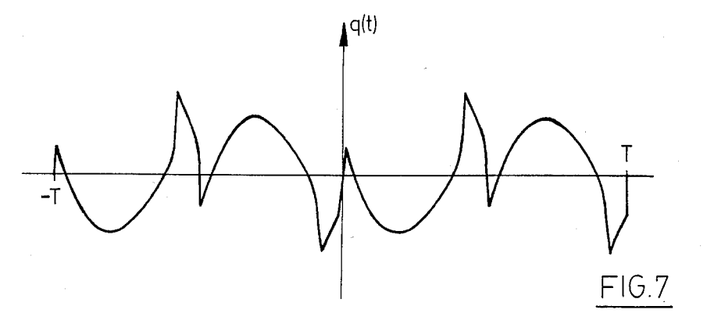
FIG. 7 is a graphical view showing a component of a received waveform that is orthogonal to the primary waveform shape.

The two component waveforms (illustrated in FIGS. 6 and 7) are therefore represented by the following time-series.

$$p_i = a \cdot y_i \tag{4}$$

$$q_i = z_i - a \cdot y_i \tag{5}$$

where $i = 0,1,\ldots(n-1)$

The time-series $p_i$ and $q_i$ are orthogonal since $$\sum_{i=0}^{n-1} q_i \cdot p_i = 0 \tag{6}$$

Frequency-Domain Calculation of Orthogonal Waveform

The discrete time series $y_i$ representing one period of the periodic primary waveform shape may be represented as a complex discrete Fourier series $Y_i$, $i=0,1,\ldots(n-1)$.

The relationship between the discrete time series $y_i$ and the discrete Fourier series $Y_i$ is specified by the discrete Fourier Transform relations $$y_i = \frac{1}{n} \sum_{k=0}^{n-1} Y_k e^{2\pi jik/n} \tag{7}$$

$$Y_i = \sum_{k=0}^{n-1} y_k e^{-2\pi jik/n} \tag{8}$$

where $j = \sqrt{-1}$

The relationship between the Fourier components $Y_i$ and the periodic primary waveform $y(t)$ having period T, and expressed in the form $$y(t) = \frac{a_0}{2} + \sum_{k=1}^{n/2} [a_k\cos(2\pi kt/T) + b_k\sin(2\pi kt/T)] \quad (9)$$

is given by the equations $$Y_0 = na_0/2$$

$$Y_k = n(a_k - jb_k)/2 \text{ for } k=1,2,\ldots n/2 \quad (10)$$

$$Y_{n-k} = n(a_k + jb_k)/2 \text{ for } k=1,2,\ldots n/2$$

or, alternatively $$a_0 = 2Y_0/n$$

$$a_k = (Y_k + Y_{n-k})/n \text{ for } k=1,2,\ldots n/2 \quad (11)$$

$$b_k = j(Y_k - Y_{n-k})/n \text{ for } k=1,2,\ldots n/2$$

Similarly, the discrete Fourier time series representation of the resultant waveform $z_i$ is $$Z_i = \sum_{k=0}^{n-1} z_k e^{-2\pi jik/n} \quad i = 0,1,\ldots(n-1) \quad (12)$$

By analogy to the time domain process described by equations (1)–(6), the method involves the separation of the resultant waveform in the frequency domain into a component identical in shape to the primary waveform (represented by discrete Fourier series $P_i$, $i=0,1,\ldots(n-1)$) and an orthogonal component (represented by the discrete Fourier series $Q_i$, $i=0,1,\ldots(n-1)$. This may be accomplished by minimizing the function $$g(b) = \sum_{i=0}^{n-1} (Z_i - b\cdot Y_i)^2 \quad (13)$$

The minimum occurs when $dg/db=0$, i.e. when $$b = \frac{\sum_{i=0}^{n-1} Z_i \cdot Y_i}{\sum_{i=0}^{n-1} Y_i^2} \quad (14)$$

giving $$P_i = b\cdot Y_i \quad (15)$$

$$Q_i = Z_i - b\cdot Y_i \quad (16)$$

for $i=0,1,\ldots(n-1)$

The discrete Fourier series $Q_i$ contains all diagnostic information about the secondary field which is distinguishable from variations in primary coupling. It is analogous to the discrete time series $q_i$ (equation (5)).

Impulse and Step Responses for Orthogonal Component of Resultant Waveform Time Domain Let the impulse response of the system be represented by a discrete time series $f_i$, $i=0,1,\ldots(n-1)$ representing one period of a periodic infinite series. Then the resultant EM waveform (represented by discrete time series $z_i$) may be expressed as a convolution of the primary EM waveform (represented by discrete time series $y_i$) and the impulse response of the system (represented by discrete time series $f_i$) as follows:

$$z_i = \sum_{k=0}^{n-1} y_k f_{i-k} \quad (17)$$

OR $$z_i = \sum_{k=0}^{n-1} f_k y_{i-k} \quad (18)$$

The impulse response may be determined by minimizing the objective function:

$$G(f_0, f_1, \ldots f_{n-1}) = \sum_{i=0}^{n-1} \left( z_i - \sum_{k=0}^{n-1} f_k y_{i-k} \right)^2 \quad (19)$$

The function G has a minimum when $$\frac{\partial G}{\partial f_j} = -2 \sum_{i=0}^{n-1} y_i - j \left( z_i - \sum_{k=0}^{n-1} f_k y_{i-k} \right) = 0 \quad (20)$$

for $j = 0,1,\ldots(n-1)$

This set of equations reduces to $$\sum_{k=0}^{n-1} f_k \cdot r_{j-k} = s_j \quad (21)$$

for $j = 0,1,\ldots(n-1)$ where $r_{j-k} = \sum_{i=0}^{n-1} y_{i-j} y_{i-k} \quad \begin{array}{l} j = 0,1,\ldots(n-1) \\ k = 0,1,\ldots(n-1) \end{array} \quad (22)$ is the autocorrelation of the primary waveform, $$s_j = \sum_{i=0}^{n-1} y_{i-j} \cdot z_i \quad j = 0,1,\ldots(n-1) \quad (23)$$

is the cross-correlation of the primary waveform with the resultant waveform, and negative subscripts for the time-series $y_i$ are defined as follows:

$$y_{i-j} = y_{i-j+n} \quad (24)$$

The system of equations (21) is a set of linear equations whose solution may be determined by inversion of the autocorrelation matrix. Let F and S be row vectors $(f_0, f_1, \ldots f_{n-1})$ and $(s_0, s_1, \ldots s_{n-1})$ respectively and define the autocorrelation matrix R as follows:

$$R = \begin{pmatrix} r_0 & r_1 & \cdots & r_{n-2} \\ r_{-1} & r_0 & \cdots & r_{n-2} \\ \vdots & \vdots & & \vdots \\ r_{1-n} & r_{2-n} & & r_0 \end{pmatrix} \quad (25)$$

Then the system of equations (21) may be represented in matrix notation as $$F\cdot R = S \quad (26)$$

which has the solution $$F = S\cdot R^{-1} \quad (27)$$

Equation (27) gives the discrete time-series representation of the impulse response of the system.

We now wish to separate the impulse response into 2 components: one which is influenced by changes in coupling with the primary field and one which is solely attributable to secondary fields. The corresponding components of the resultant field are given by equations (4) and (5). Let $f_i'$, $i=0,1,\ldots(n-1)$ be the discrete time series representation of the impulse response of the system for the component of the resultant field which has identical shape to the primary field.

Then, from equations (4) and (18)

$$p_i = ay_i = \sum_{k=0}^{n-1} f_k' \cdot y_{i-k} \quad (28)$$

This equation can only be satisfied by $$f_k' = \begin{cases} a \text{ for } k = 0 \\ 0 \text{ for } k = 1,2,\ldots(n-1) \end{cases} \quad (29)$$

Therefore the coupling of the receiving sensor with the primary field influences only the first component of the discrete time series representation of the impulse response.

The component of the impulse response function which is attributable to the orthogonal component of the resultant field (represented by discrete time series $q_i$) is $$f_k'' = f_k - f_k' = f_k \quad \text{for } k=1,2,\ldots(n-1) \quad (30)$$

Figure 8:
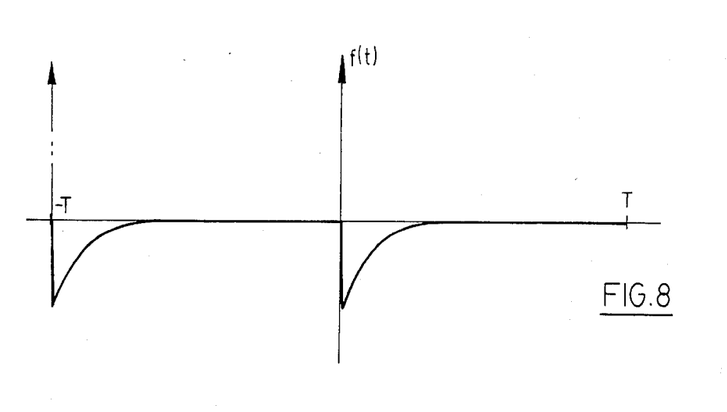
FIG. 8 is a graphical view showing an impulse response function (amplitude as a function of time)

The procedure outlined above results in the direct computation of the time series $f_i$ of which components $f_1, f_2, \ldots f_{n-1}$ are unaffected by the primary field coupling and contain all available diagnostic information about nearby conductors. This procedure does not depend upon prior separation of the resultant field into components which are identical to and orthogonal to the primary field respectively as described by equations (1)–(5). However initial removal of the component of the resultant field which is identical in shape to the primary field will minimize round-off error when computing the impulse response. In addition to the foregoing procedure, other simple functions of the impulse response components $f_1, f_2, \ldots f_{n-1}$ may be derived such as the calculation of the step response function by integration of the impulse response function, (see FIG. 8) e.g.

$$g_i = \sum_{k=0}^{i} f_k \cdot T/n \text{ for } i = 0,1,\ldots(n-1) \quad (31)$$

Note that the uncertainty in $f_0$ results in an uncertainty in the d.c. level of the integral represented by time series $g_i$. This could be eliminated by evaluating.

$$g_i' = g_i - g_0 \quad i=0,1,\ldots(n-1) \quad (32)$$

or $$g_i'' = g_i - g_{i-1} \quad i=1,2,\ldots(n-1) \quad (33)$$

Impulse & Step Responses-Frequency Domain

This involves separation of the impulse response of the system into 2 components: one which is independent of changes in coupling with the primary field and one which is solely attributable to secondary fields. The impulse response may be represented by the complex discrete Fourier series $F_i$, $i=0, 1, \ldots (n-1)$ where $$Z_i = Y_i \cdot F_i \quad i=0,1,\ldots(n-1) \quad (34)$$

or $$F_i = Z_i/Y_i \quad i=0,1,\ldots(n-1) \quad (35)$$

Multiplication in the frequency domain (equation (34)) is analogous to convolution in the time domain (equation (17)). The impulse response as expressed by equation (35) may be computed directly and separated into its real and imaginery components $R_i$ and $I_i$ respectively.

$$F_i = R_i + j \cdot I_i \quad i=0,1,\ldots(n-1) \quad (36)$$

Figure 9:
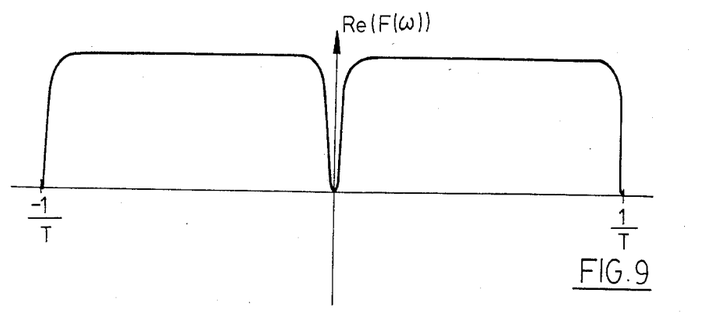
FIG. 9 is a graphical view showing the real component of an impulse response, in the frequency domain.
Figure 10:
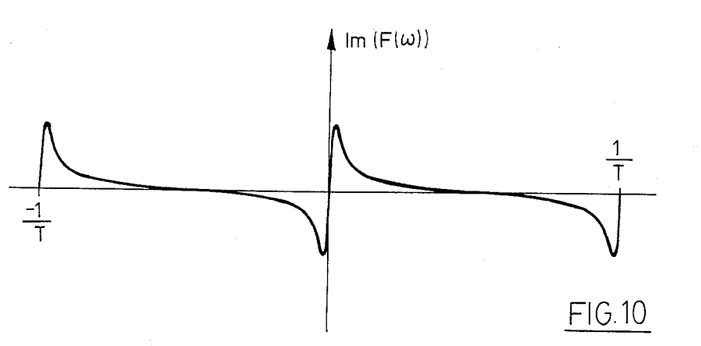
FIG. 10 is a graphical view showing the imaginary component of an impulse response function in the frequency domain.

The portion of the impulse response function which is influenced by changes in coupling with the primary field is given by the discrete Fourier series.

$$F_i' = P_i/Y_i = b \quad i=0,1,\ldots(n-1) \quad (37)$$

Where $P_i$ is given by equation (15). This represents a constant d.c. contribution to the real components of the impulse response function. The portion of the impulse response function which is solely attributable to secondary fields is given by (see FIGS. 9, 10).

$$F_i'' = F_i - F_i' = (R_i - b) + j \cdot I_i \quad i=0,1,\ldots(n-1) \quad (38)$$

For systems where the instantaneous coupling of the primary field with the receiving sensor is unknown, the portion of the impulse response function which is solely attributable to secondary fields consists of: the imaginary (or quadrature) components ($I_i$) at each frequency and the differences of the real (or in-phase) components between pairs of frequencies.

The invention has been described as applied to a primary waveform comprising Bi-Polar, half-sine pulses, but in general there is a wide latitude in the type of primary waveform that may be used. It is required that the waveform of the primary field be (a) known, (b) time varying, and (c) it should contain a sufficient number and range of frequency components appropriate for the electrical parameter (e.g. conductivity) to be measured.

The invention has particularly advantageous application to airborne prospecting systems in which the relative orientation of transmitting and receiving coils, and consequently direct coupling of a primary field, may be varying significantly. However, the techniques of the invention also have application to ground systems in which the transmitting loop is carried on a ground vehicle or laid on the ground, although in the latter circumstances significant variations in direct coupling would normally not be expected, and much of the advantage of the invention in accommodating such variations is not obtained. The analysis of the received signal can be carried out in real time or can be telemetered or tape recorded for processing at a central station. In the usual airborne application of the invention parallel traverses are flown at an altitude typically in the vicinity of 400 feet with intervals in the vicinity of 1000 feet between traverses.

We claim:

1. A method of measuring anomalous complex variations of a predetermined electrical parameter in a target zone, comprising:

(a) generating a complex primary electromagnetic field and directing said primary field toward said target zone, said primary electromagnetic field being defined by a primary waveform of known shape and containing a plurality of frequency components appropriate to said target zone, said frequency components being of known frequencies, phase and relative amplitude, said primary electromagnetic field causing eddy currents to be induced in a conductive body present in said target zone, said eddy currents resulting in the formation of detectable secondary electromagnetic fields, (b) receiving, by means of a receiving system that is positioned in the vicinity of said primary electromagnetic field, electromagnetic signals comprising a first component consisting of signals of substantially identical waveform to said primary waveform and a second component consisting of signals of a waveform that is different from said primary waveform, said second component including signals that are received during periods when said primary electromagnetic field is varying in time, (c) generating a reference signal having a waveform similar to said primary waveform, (d) periodically adjusting components of said reference signal so as to fit said reference signal to said first component of said received signals, (e) subtracting said adjusted reference signal from said received signals so as to effectively reduce the effect of direct coupling of said receiving system with said primary field, and (f) analyzing said received signals from which said adjusted reference signal has been subtracted to determine the existence of any anomalous variations in said predetermined parameter in said target zone.

2. A method as claimed in claim 1 wherein said received signals are defined by time series $z_i$, said first component is defined by time series $p_i$, and said second component is defined by time series $q_i$ where $$z_i = p_i + q_i \text{ for } i = 0, 1, \ldots (n-1),$$

wherein said reference signal is defined by a time series $y_i$, and wherein $$a = \frac{\sum_{i=0}^{n-1} z_i \cdot y_i}{\sum_{i=0}^{n-1} y_i^2}$$

where a is a coefficient of $y_i$ of such value as to enable $y_i$ to be fitted to $p_i$ to a least squares minimum.

3. A method as claimed in claim 1 wherein said received signals are represented by a discrete Fourier time series $Z_i$ where $$Z_i = \sum_{k=0}^{n-1} z_k e^{-2\Pi j i k/n} \ i = 0, 1, \ldots (n-1),$$

wherein said first component is represented by discrete Fourier series $P_i$, $i = 0, 1, \ldots (n-1)$, wherein said second component is represented by discrete Fourier series $Q_i$, $i = 0, 1, \ldots (n-1)$, and wherein $Q_i = Z_i - b \cdot Y_i$ where $Y_i$ is a complex discrete Fourier series representing said reference signal and $$b = \frac{\sum_{i=0}^{n-1} Z_i \cdot Y_i}{\sum_{i=0}^{n-1} Y_i^2}$$

4. A method of measuring anomalous complex variations of a predetermined electrical parameter in a target zone, comprising:

(a) generating a complex primary electromagnetic field and directing said primary field toward said target zone, said primary electromagnetic field being defined by a primary waveform of known shape and containing a plurality of frequency components appropriate to said target zone, said frequency components being of known frequencies, phase and relative amplitude, said primary electromagnetic field causing eddy currents to be induced in a conductive body present in said target zone, said eddy currents resulting in the formation of detectable secondary electromagnetic fields, (b) receiving, by means of a receiving system that is positioned in the vicinity of said primary electromagnetic field, electromagnetic signals corresponding to the resultant of the primary and secondary fields sensed by said receiving system, including components of said secondary field detected when said primary field is varying in time, (c) generating from said resultant on a periodic basis a receiving system impulse response function representing the response of said receiving system to a primary field of impulse shape, (d) generating on said periodic basis a corresponding impulse response function representing the component of said receiving system impulse function attributable solely to direct coupling of said receiving system with said primary field, (e) subtracting from said receiving system impulse function said corresponding impulse response function representing the said component attributable solely to direct coupling, and (f) analyzing said receiving system impulse function from which said corresponding impulse function representing the said component attributable solely to direct coupling has been subtracted to determine the existence of any anomalous variations in said predetermined parameter in said target zone.

5. A method as claimed in claim 4 wherein said receiving system impulse response function is represented by a discrete time series, and wherein said receiving system impulse response function is derived by deconvolving the primary waveform from the waveform of said resultant.

6. A method as claimed in claim 4 wherein said receiving system impulse response function is represented by a complex discrete Fourier series and wherein said receiving system impulse response function is derived by dividing the Fourier series transform of the waveform of the resultant by the Fourier series transform of the primary waveform.

7. A method as claimed in claim 5 or 6 comprising, prior to generating said receiving system impulse response function and said corresponding impulse response functions representing the said component:

generating a reference signal containing said plurality of frequency components and having a waveform similar to said primary waveform, periodically adjusting components of said reference signal so as to fit said reference signal to a component of said received signals consisting of signals of substantially identical waveform to said primary waveform, and subtracting said adjusted reference signal from said received signals so as to reduce the effect of direct coupling of said receiving system with the primary field.